(12) United States Patent
Matthews et al.

(10) Patent No.: US 8,902,159 B1
(45) Date of Patent: Dec. 2, 2014

(54) ERGONOMIC SUPPORT APPARATUS HAVING SITUATIONAL SENSORY AUGMENTATION

(76) Inventors: John Matthews, Baltimore, MD (US); Christopher Lee, Randallstown, MD (US); Christian Snuggs, Brooklyn, MD (US); Steven Hollis, Baltimore, MD (US); Victor McGaney, Baltimore, MD (US)

( * ) Notice: Subject to any disclaimer, the term of this patent is extended or adjusted under 35 U.S.C. 154(b) by 212 days.

(21) Appl. No.: 13/556,764

(22) Filed: Jul. 24, 2012

(51) Int. Cl.
*G09G 5/00* (2006.01)

(52) U.S. Cl.
USPC ............................. 345/156; 463/30; 463/47

(58) Field of Classification Search
None
See application file for complete search history.

(56) References Cited

U.S. PATENT DOCUMENTS

| | | | |
|---|---|---|---|
| 4,197,604 A | 4/1980 | Nakamura | |
| 5,419,613 A | 5/1995 | Wedeking | |
| 5,669,818 A | 9/1997 | Thorner et al. | |
| 5,857,986 A | 1/1999 | Moriyasu | |
| 6,256,818 B1 | 7/2001 | Hughes | |
| 6,287,193 B1 | 9/2001 | Rehkemper et al. | |
| 6,422,941 B1 | 7/2002 | Thorner et al. | |
| D465,244 S | 11/2002 | Hussaini et al. | |
| 6,685,024 B1 | 2/2004 | Matthews | |
| 6,691,352 B2 | 2/2004 | Wang | |
| 7,125,074 B2 | 10/2006 | Real et al. | |
| 7,540,847 B2 | 6/2009 | Klein et al. | |
| 7,654,901 B2 | 2/2010 | Breving | |
| 7,681,949 B2 | 3/2010 | Nathan et al. | |
| 2006/0217197 A1 | 9/2006 | Biheller | |
| 2006/0287089 A1 | 12/2006 | Addington et al. | |
| 2007/0045951 A1 | 3/2007 | Robertson et al. | |
| 2007/0143927 A1 | 6/2007 | Noro et al. | |
| 2007/0192961 A1* | 8/2007 | Tidwell et al. | 5/655 |
| 2008/0004114 A1 | 1/2008 | McVicar et al. | |
| 2008/0102424 A1 | 5/2008 | Holljes | |
| 2008/0111408 A1 | 5/2008 | Duran et al. | |
| 2008/0207317 A1 | 8/2008 | Tetterington | |
| 2009/0069081 A1 | 3/2009 | Thorner | |
| 2009/0094750 A1 | 4/2009 | Oguma et al. | |
| 2009/0229055 A1 | 9/2009 | Kim | |
| 2009/0233710 A1 | 9/2009 | Roberts | |
| 2010/0009762 A1 | 1/2010 | Takeda et al. | |
| 2010/0261526 A1 | 10/2010 | Anderson et al. | |
| 2011/0199304 A1 | 8/2011 | Walley et al. | |
| 2011/0275437 A1 | 11/2011 | Minchella Jennings et al. | |

* cited by examiner

*Primary Examiner* — Adam R Giesy
(74) *Attorney, Agent, or Firm* — Rosenberg, Klein & Lee

(57) ABSTRACT

An apparatus is provided for combined ergonomic support and situational sensory augmentation interface during an interactive session within a virtual environment generated by a computer system. The apparatus comprises a resilient body defining a mid portion extending laterally between a pair of side portions projecting transversely outward therefrom to terminate at respective free ends. The mid portion extends across a lap of a user. The mid and side portions collectively define an upper surface for hand and forearm support for the user and an inner side surface contoured about a cradle space for receiving a torso of the user in cradling manner. At least one actuator disposed on the resilient body is selectively driven in cooperation with the interactive session to generate tactile feedback to the user through at least one of the upper and inner side surfaces of the resilient body.

24 Claims, 10 Drawing Sheets

ERGONOMIC SUPPORT APPARATUS HAVING SITUATIONAL SENSORY AUGMENTATION

BACKGROUND OF THE INVENTION

The present invention is generally directed to an apparatus for providing ergonomic support and situational sensory augmentation for a user. More specifically, the present invention is directed to an apparatus which contacts different portions of the user's body to ease muscular strain, promote healthy posture, and maintain comfort for the user while providing sensory feedback as needed during a computer assisted activity.

Computer assisted activities are becoming increasingly prevalent and widespread. In just about every field of business and area of technology, and across generally all walks of life, user interaction with and within a computer-generated environment is commonplace. Many activities involve some degree of computer-rendered virtual reality, where the interaction typically occurs through a hand-held controller or other interface device physically manipulated by the user to enter controlling commands from his or her physical environment to the virtual environment. Examples include computer gaming, remote robotic control, training simulation, or other such applications.

The interactive session in many of these applications tends to be both continual and prolonged. This puts considerable strain on the user in a number of respects. Perhaps most notably, the need to hold a static body posture and maintain the isometric limb positions for extended periods to continually handle an interface device causes muscle strain and undue fatigue. That is particularly so when the user is naturally prone to poor posture, and is much too mentally immersed in the interaction to exercise any conscious care over ergonomic positioning beyond the hand manipulations through which interaction with the virtual environment may exclusively occur.

Another less apparent source of strain during prolonged interactive sessions is the lack of physical stimulation except at the usual eyes, hands, and ears which typically serve as the sensory links between the physical and virtual environments. This not only dulls the interactive experience for the user, it loads the cognitive processes of the user with the added burden of imagining those tactile sensations which cannot actually be delivered to other parts of his/her body in the physical environment, as they are in the virtual embodiment.

Various measures have been taken in the applicable arts to ease and enhance the user's interactive experience, and to lessen the void between an interactive session's virtual and physical realities. Most of these measures have been directed to the goal of providing more realistic physical representations of virtual sensations. Such known measures include the use of so-called haptic interfaces to provide tactile feedback to the user in addition to the visual and audial feedback he or she would normally receive during an interactive session. Typically, the haptic interface is provided in the hand-held controller device directly manipulated by the user to command actions within the virtual environment. Consequential effects of commanded actions may then be delivered to the user's physical environment in the form of vibrations or other tactile feedback felt through the manipulated controller itself. Haptic feedback in other more elaborate applications is additionally delivered during an interactive session through surrounding system fixtures and equipment like seating surfaces and gloves.

While these known haptic feedback measures add to the overall interactive experience, they are limited in the portions of the user's body they affect, and therefore limited in the degree of realism of the physical sensations that are imparted. Obviously, many known interfaces bring rumbling or other tactile feedback to bear on the controller-manipulating hand. Others apply similar tactile feedback to the back and bottom of the user when seated in a specially equipped system operating console. Yet, these known interfaces fail to provide in a simple and portable device suitable delivery of localized tactile feedback to various other portions of the user's body like the elbow/forearms, thighs, torso, or the like.

Such known haptic feedback measures also lack suitable provision for improving the user's posture and ergonomic support while he/she engages in an interactive session. That is, users may slump while seated during an interactive session on haptic interface equipped seating surfaces just as well as they may while seated on any other seating surface. Likewise, system equipment like haptic interface gloves may provide realistic feedback, but do nothing for instance to relieve the strain on the users in holding their hands or forearms properly oriented and in place when postured during an interactive session.

Ergonomic chairs and various pillow type devices are known in the art. Some are even intended specifically for use during computer interactive sessions. Most, however, are not equipped with sufficient measures to provide any haptic feedback at all, let alone in the manner noted above. Nor are those devices equipped with sufficient tactile feedback to remedy the types of deficiencies noted above.

There is therefore a need for an ergonomic support apparatus for use during a computer interactive session. There is a need for such apparatus which serves to ease muscular strain, promote healthy posture, and maintain comfort during an interactive session while providing situational sensory feedback to certain localized portions of the user's body.

SUMMARY OF THE INVENTION

It is an object of the present invention to provide an ergonomic support apparatus for use during a computer interactive session.

It is another object of the present invention to provide an ergonomic support apparatus which serves to ease muscular strain, promote healthy posture, and maintain comfort during an interactive session.

It is yet another object of the present invention to provide an ergonomic support apparatus which delivers situational sensory feedback to certain localized portions of the user's body.

These and other objects are attained in an apparatus formed in accordance with an exemplary embodiment of the present invention for combined ergonomic support and situational sensory augmentation interface during an interactive session within a virtual environment generated by a computer system. The apparatus comprises a resilient body defining a mid portion extending laterally between a pair of side portions projecting transversely outward therefrom to terminate at respective free ends. The mid portion extends across a lap of a user. The mid and side portions collectively define an upper surface for hand and forearm support for the user and an inner side surface contoured about a cradle space for receiving a torso of the user in cradling manner. At least one actuator disposed on the resilient body is selectively driven in cooperation with the interactive session to generate tactile feedback to the user through at least one of the upper and inner side surfaces of the resilient body.

An ergonomic support apparatus formed in accordance with certain exemplary embodiments of the present invention delivers haptic feedback to a user in accordance with computer interactive user activity within a virtual environment generated by a computer system. The ergonomic support apparatus comprises a resilient body defining a bridge portion extending laterally between a pair of malleably reconfigurable wing portions projecting transversely outward therefrom to terminate at respective free ends. The bridge portion extends across a lap of a user. The bridge and wing portions collectively define an upper surface for hand and forearm support for the user, and an inner side surface contoured about a cradle space for receiving a torso of the user in cradling manner. At least one actuator is disposed on the resilient body. The actuator is selectively driven in coordination with the computer interactive user activity to generate tactile feedback to the user's torso through at least one of the upper and inner side surfaces of the resilient body. A controller is disposed on the resilient body and coupled to the actuator. The controller communicates with the computer system to drive the actuator responsive thereto. The tactile feedback is thereby generated in time synchronized manner with progression of the computer interactive user activity within the virtual environment to augment sensory feedback to the user.

An ergonomic support apparatus formed in accordance with certain other exemplary embodiments of the present invention delivers haptic feedback to a user in accordance with computer interactive user activity within a virtual environment generated by a computer system. The ergonomic support apparatus comprises a resilient body defining a bridge portion extending laterally between a pair of wing portions projecting transversely outward therefrom to terminate at respective free ends. The bridge portion extends across a lap of a user. The bridge and wing portions collectively define an upper surface for hand and forearm support for the user, as well as an inner side surface contoured about a cradle space for receiving a torso of the user in cradling manner. A plurality of actuators disposed on the resilient body are displaced one from the other to be selectively driven in coordination with the computer interactive user activity to generate tactile feedback at corresponding parts of the user's torso, forearms, and hands through at least one of the upper and inner side surfaces of the resilient body. A controller is disposed on said resilient body and coupled to the actuators, which communicates with the computer system to drive the actuators responsive thereto in time synchronized manner with progression of the computer interactive user activity within the virtual environment. Sensory feedback to the user is thereby augmented. At least one communication device is disposed on the resilient body and coupled to the controller to establish an audio and video link with a remote site therethrough to maintain a real-time trash talk link during the interactive session.

DESCRIPTION OF THE PREFERRED EMBODIMENTS

Figure 1:
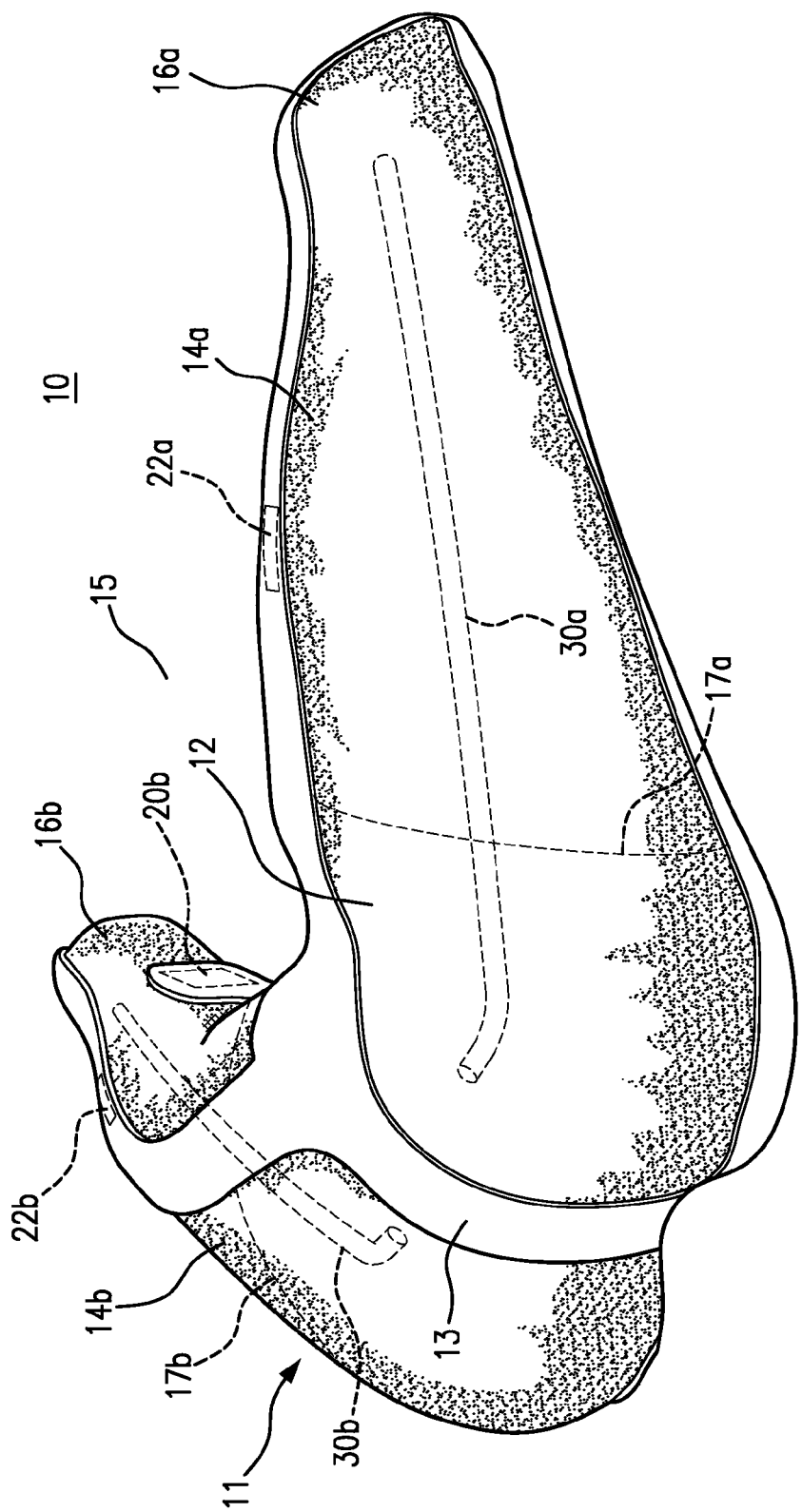
FIG. 1 is a top perspective view of one exemplary embodiment of an apparatus formed in accordance with the present invention.

Generally, an apparatus formed in accordance with certain exemplary embodiments of the present invention serves to provide comfortable ergonomic support of a user during extended periods of interaction with a computer-controlled system. In doing so, the apparatus reinforces optimal bodily posture, which in turn promotes blood circulation, relaxes muscles, and eases orthopedic strain, among other things. Resilient portions of the apparatus engage respective parts of a user's anatomy toward that end, while one or more actuators provided with certain of those portions are selectively driven to provide situational augmentation of sensory feedback to enhance the user's interactive experience within a computer generated virtual environment. Preferably, such resilient portions conform sufficiently to the user's anatomy to there maintain firm support and points of efficient delivery for sensory feedback.

Referring now to FIGS. 1-5, an apparatus 10 formed in accordance with one exemplary embodiment of the present invention is illustrated. Apparatus 10 includes a resilient body 11 having a mid, or bridge, portion 12 that extends laterally between a pair of side portions 14*a*, 14*b* projecting transversely outward therefrom. The side portions 14*a*, 14*b* flare outward much like wing portions from the bridge portion 12 to terminate at respective free ends 16*a*, 16*b*.

During use, the mid portion is situated preferably to extend across the lap of a user, while the wing portions 14*a*, 14*b* extend about the opposed sides of the user's torso, preferably at and around the user's abdominal core region. The bridge and wing portions 12, 14*a*, 14*b* collectively define a table- or shelf-like upper surface segment which wraps partially around the user's torso, such that the user may easily rest his/her hands, forearms, and/or elbows thereon while handling a controller device for the interactive session. The bridge and wing portions 12, 14*a*, 14*b* thereby define an inner side surface contoured about a cradle space 15 for snuggly receiving the user's torso in cradling manner. Preferably, substantial portions of this inner side surface approaching the terminal ends 16*a*, 16*b* maintains close contact with the user's abdominal core. As described in following paragraphs, even the ends 16*a*, 16*b* may be configured in certain embodiments to bend or curve inward toward the cradle space 15 to broaden the area of contact with the user's abdominal core (see FIG. 2) and help to keep the resilient body 11 in place.

The combined effect of the mildly 'fitted' engagement which results (of the user's waist region) is to firm up the laterally supporting contact about much of the user's abdominal core and establish a base contact surface through which to deliver supplementary tactile feedback to the user. Preferably, the bottom surfaces 18a, 18b extending underneath the wing portions 14a, 14b and continuing underneath respective portions of the bridge portion 12 each define a concave contour suitably oriented for conformed fit over parts of the seated user's upper thighs. This stabilizes the resilient body 11 in its cradling position about the user's abdominal core, while further extending the base contact surface through which to deliver other supplementary tactile feedback to the user.

At least one actuator 20a, 20b, 22a, 22b, 24a, 24b, 25, 26a, 26b is disposed on the resilient body 11 and selectively driven in cooperation with the interactive session to generate tactile feedback to the user. Preferably, the actuated tactile feedback is delivered through at least one of the upper, inner side, and bottom surfaces defined by the resilient body 11. Alternatively, the actuated tactile feedback may be delivered to the user through any other surface or part of the resilient body 11 which suitably contacts the user's body during an interactive session.

Each actuator 20a, 20b, 22a, 22b, 24a, 24b, 25, 26a, 26b employed on the resilient body 11 may be embedded within the body or disposed on a surface of the body, depending on the particular requirements of the intended application, nature of the actuator employed, and other such application-specific factors. Any suitable actuator known in the art may be used to provide tactile output responsive to the computer system controlling the interactive session, or responsive to one or more user controllers providing commands and other input to the computer system during the interactive session. Examples of such actuators include transducers of various electromechanical, electroacoustic, thermoelectric, or electropneumatic type. They include the various haptic interfaces known in the art which respond in suitably synchronized manner to virtual events as they unfold within a virtual environment generated by the given game, simulation, or other computer system.

The actuators 20a, 20b, 22a, 22b, 24a, 24b, 25, 26a, 26b may be positioned on the resilient body 11 to deliver haptic feedback to at least one corresponding area of the user's torso, forearms, or thighs. Preferably, a combination of these actuators are provided on the resilient body 11, displaced one from the other. In a computer gaming application, for instance, at least two forward actuators 24a, 24b at the user's front left and right abdominal areas and at least two rearward actuators 20a, 20b at the side left right abdominal areas would be preferable to provide sufficient supplementary feedback coverage. Regardless of the number employed, the variously situated actuators are controlled in coordinated manner, selectively driven to deliver haptic feedback to one or more corresponding areas of the user's torso, forearms, or thighs.

Their coordinated actuation would then deliver localized physical sensations to these different areas of the user's body as necessary to match the action he/she is experiencing in the virtual realm. For example, if the user were to receive a blow to his/her left side during an encounter with a foe in a computer gaming environment, actuators 20a, 24a of suitable type may be actuated to momentarily deflect or vibrate to emulate the blow's force of impact on his/her left abdominal side. Similarly, if the user were to experience an inferno off to his/her right during that computer gaming encounter, one or more actuators 20b, 22b, 24b, and 26b of suitable type may be actuated to apply corresponding heat to the user's abdominal side, forearm, and/or thigh on that right side. Furthermore, if the user were to experience a nearby explosion in that computer gaming encounter, all actuators 20a, 20b, 22a, 22b, 24a, 24b, 25, 26a, 26b of suitable type may be actuated to momentarily vibrate and thereby emulate the explosive shockwave.

The versatility of response may be enhanced in certain embodiments by equipping one or more of the actuators 20a, 20b, 22a, 22b, 24a, 24b, 25, 26a, 26b to actually be a set of similarly situated but separately actuable transducers of more than one type. That is, each actuator site may include a combination of electromechanical, electroacoustic, thermoelectric, and/or electropneumatic transducers which may be independently actuated as needed to generate the particular type of tactile sensation(s) appropriate for the virtual encounter taking place (force, pressure, vibration, heating, cooling, or the like).

In certain embodiments, one or more of the actuators 20a, 20b, 22a, 22b, 24a, 24b, 25, 26a, 26b may themselves serve in a sensing mode to receive tactile input applied by the user's body and generate a supplemental control input for the given computer system. Otherwise, additional sensing elements of any suitable type known in the art may be employed at or near certain actuator sites for this purpose. Movement or pressure applied by the user through his/her forearms, torso, and/or thighs may then be transduced to affect the command input provided by the user during the interactive session. The added sources of command input would ease the finger dexterity required to manipulate a given handheld controller. They would also relieve the complexity typical of such handheld controllers to a limited number of control buttons to launch different types of commands.

For example, certain secondary control buttons provided on a handheld controlling device such as for function keys or mode selection switches may be designated for control by the supplemental command input picked up by the sensing elements defined on the resilient body 11. The user may then devote his/her hand and actual finger manipulations to the primary controls like direction pointing, action initiating, and such. Alternatively, the supplemental command input picked up by the sensing elements defined on the resilient body 11 may be passed directly on to the host computer system for added dimensions of control command for directly affecting the virtual action.

In certain other embodiments, one or more of the actuators 20a, 20b, 22a, 22b, 24a, 24b, 25, 26a, 26b may constitute or include an electroacoustic transducer that generates sufficiently audible acoustic signals to supplement the sound effects provided during the interactive session. In a gaming session, for instance, the gaming console which serves as the controlling computer system and/or the handheld controller manipulated by the user provide sound effects to round out the interactive experience with the virtual realm. The sound effects are becoming increasingly sophisticated. Acoustic devices suitably situated at different points along the resilient body 11 and suitably activated in concert with other constituent audio may facilitate the delivery of the same, making for a richer, more realistic sound effect overall. Acoustic devices physically displaced from the primary source(s) projecting the other audio would enhance the stereophonic effect of the combined sound. Sound effects like the directional boom of explosions on a virtual battlefield, the electronic zapping of a cyber gun during a virtual firefight, or the cracking impact of a hit during virtual football game action may notably benefit from such supplemental sound source devices. Where necessary, the devices could also serve as substitute sources of the sound should the primary source(s) be unavailable for some reason.

Preferably, the resilient body 11 is formed with a layered structure of soft cotton-like material partially or wholly padded externally with an elastomeric material such as memory foam or the like. Portions of the resilient body 11 may be formed of elastomeric material, gel-filled material, or some other resilient yet firm material with sufficient durability to repeatedly withstand extended periods of continuous use. Alternatively, the resilient body 11 may be integrally formed of such resiliently firm material. Depending on the particular application, the resilient body 11 may be formed with any other suitable material(s) and structure(s) known in the art to maintain the combined degree of resilience and structural integrity required to maintain comfortable ergonomic support of the user and facilitate effective delivery of sensory feedback.

The apparatus 10 includes in the exemplary embodiment illustrated a striping member 13 applied to extend along a predetermined pattern over the outer surface of the resilient body 11. The striping member 13, when employed, may describe any suitable pattern on the resilient body 11 other than that shown. The striping member 13 preferably serves several combined purposes. First, it may be used as shown to add an aesthetically striking design to the apparatus 10. In this regard, the striping member 13 may be varied in shape, configuration, relative dimensions, orientation, color, texture, and the like relative to the resilient body 11 to suitably vary its design impact.

When applied to the resilient body 11 as a tape-like member, it serves to protectively cover certain portions of the resilient body and its coupled components. The striping member 13 may, for example, protectively cover and retain one or more of the actuators 20a, 20b, 22a, 22b, 24a, 24b, 25 which may have been provided as patch-like devices either attached to an outer surface of the resilient body 11, or within a pocket or recess formed in that outer surface. In other examples, the striping member 13 may also be configured to extend along and protectively cover trench-like creases or grooves that may be formed in the outer surfaces of the resilient body 11 to serve as conduits for wiring routed to/from the actuators or any other component employed (like controller, power source, sensors, acoustic devices, and the like).

The striping member 13 may itself be formed of an elastomeric foam or other such resilient material. It would then provide an added layer of cushion to reinforce certain physical interfaces between the user and the resilient body 11.

Referring to FIGS. 5-8, the apparatus 10 may be used by a seated user typically by drawing the mid-bridge portion 12 of the resilient body 11 snuggly against his front abdominal area. The bridge portion 12 then extends transversely across his lap, with the concavely curved bottom surfaces 18a, 18b receiving the top portions of each thigh. The wing portions 14a, 14b project from the bridge portion 12 to extend around the user's torso just above his waist. The bridge and wing portions 12, 14a, 14b together provide a comfortable shelf-like support stabilized over the user's lap. The user may comfortably rest his forearms and elbows to in turn support the upper part of his body in a substantially upright, healthy posture while seated. This keeps the user from slouching forward as would otherwise occur when the user's arm and back muscles tire during an extended gaming or other such computer interactive session and drops his forearms and elbows for some measure of support. Because his abdominal area is cradled by the bridge and wing portions 12, 14a, 14b, and the bottom surfaces 18a, 18b conform to the undulating contours of his lap, the resilient body 11 tends to remain in place even when the user shifts his weight between elbows or directs squirming movement to his torso. The cushion contact with the resilient body 11 maintains user comfort and relaxation through the extended periods of intense focus and occasional spurts of excited tension which typify many gaming sessions.

Figure 2:
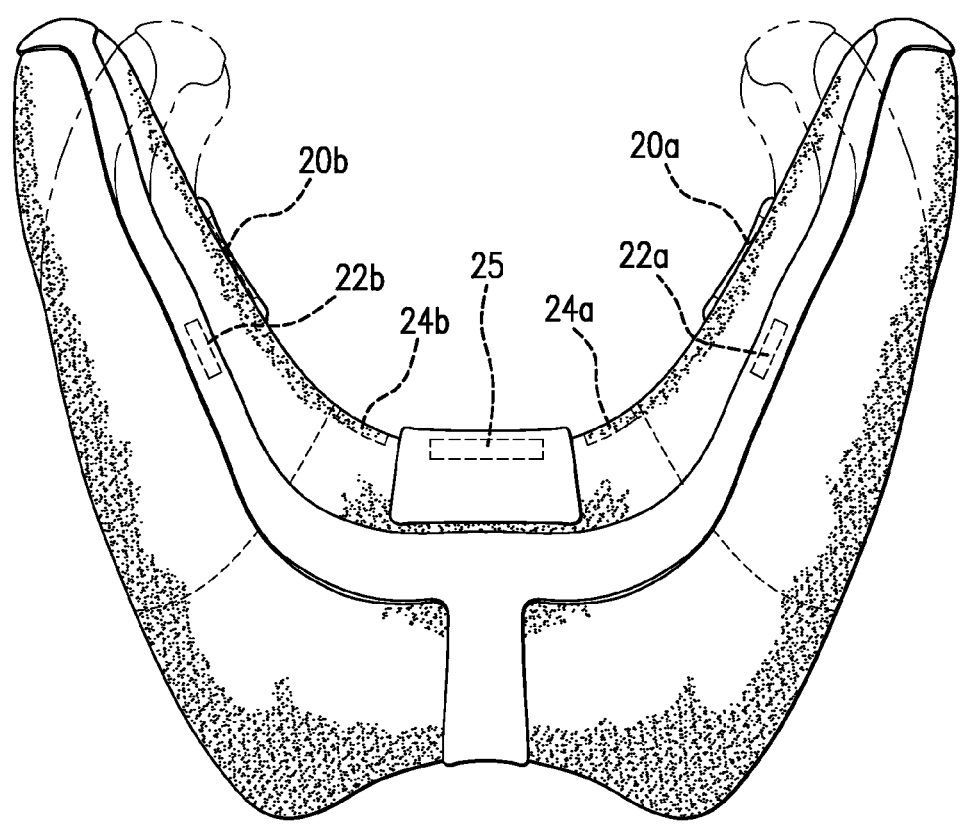
FIG. 2 is a plan view of the exemplary embodiment of FIG. 1.
Figure 3:
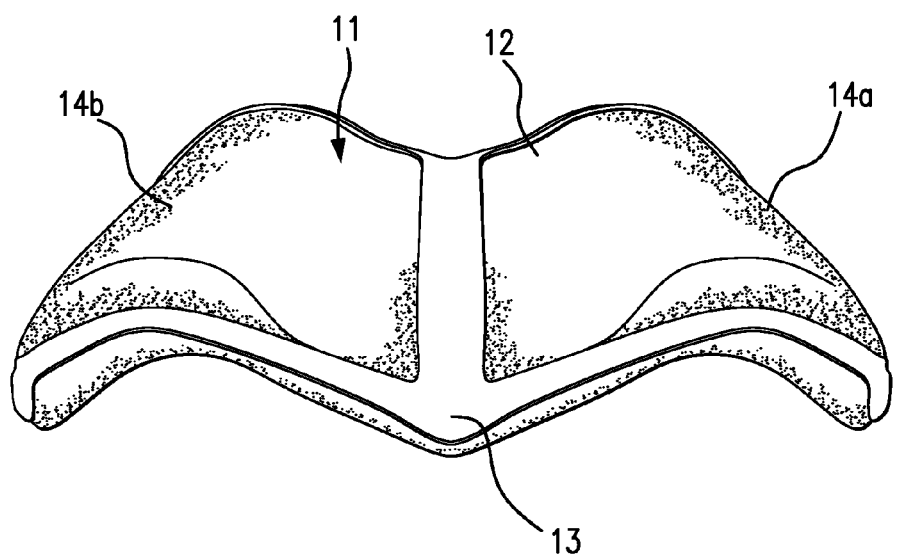
FIG. 3 is a front elevational view of the embodiment of FIG. 1.

Obviously, the degree of comfort provided by apparatus 10 will depend on the degree to which it fits a particular user's body. To allow for custom adjustments toward that end, apparatus 10 in certain alternative embodiments include one or more malleable frame members 30a, 30b embedded therein. The malleability of the skeletal frame members 30a, 30b then enables portions of the resilient body 11 to be reconfigured in shape to suit the user's particular body type and size. Each of the wing portions 14a, 14b for instance may be bent toward or away from one another to re-shape/re-size the cradle space 15. Similarly, the end parts 16a, 16b of each wing portion 14a, 14b may be bent inward as illustrated in FIG. 2 to more closely engage the user's torso and prevent loosening of the cradled engagement thereof.

Such malleable frame members 30a, 30b may be formed of any suitable material known in the art with sufficient malleability and strength to withstand repeated reconfiguration without premature fatigue and failure. A bendable metal material or the like of sufficient dimension to avoid excessive weighting of the apparatus 10 may be employed.

When used, such malleable frame members 30a, 30b may be fully embedded inside the resilient body 11 during fabrication. Alternatively, one or more such members 30a, 30b may be insertable in corresponding bores accessible through an opening formed at a discrete part of the resilient body 11 (such as a part normally covered by the striping member 13).

Figure 9:
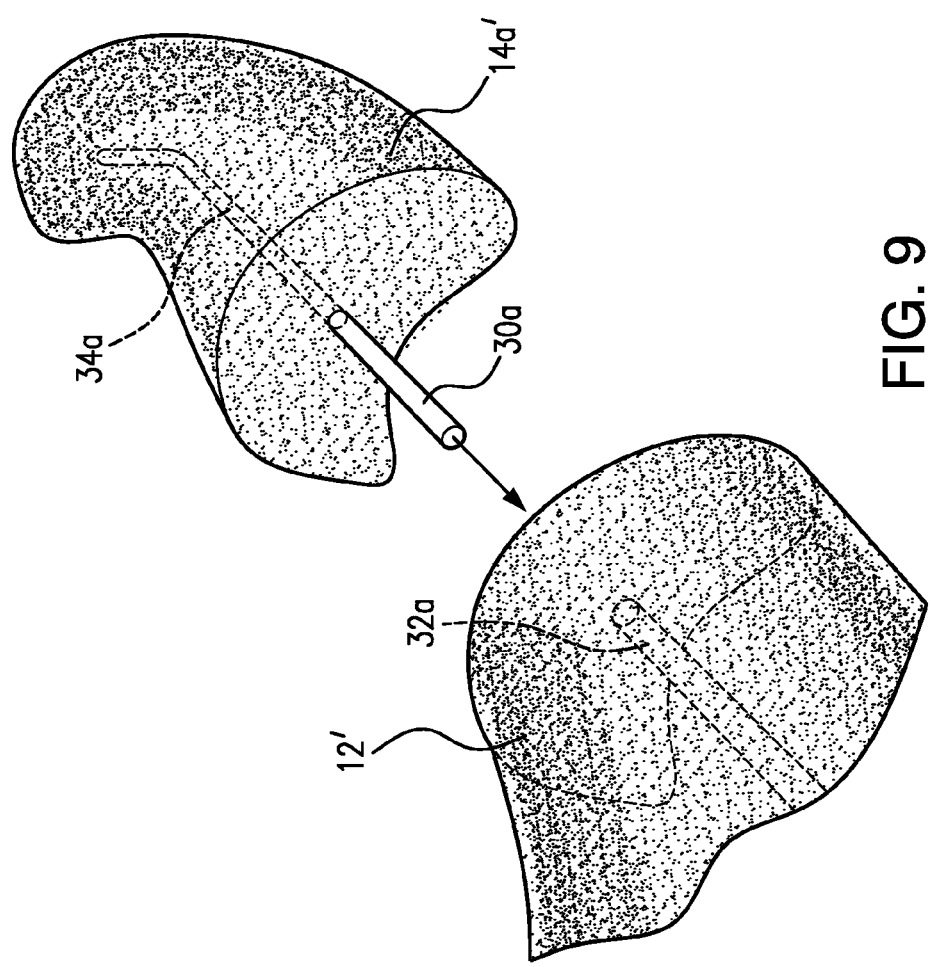
FIG. 9 is an exploded perspective view, partially cut away, of a portion of an apparatus formed in accordance with an alternate embodiment of the present invention; and, FIG. 10 is a block diagram schematically illustrating an exemplary intercoupling of units for an operational system incorporated in an apparatus formed in accordance with various exemplary embodiments of the present invention, such as illustrated in FIGS. 1-9.

In certain other embodiments, such as illustrated in FIG. 9, individual frame members 30a, 30b, may provide convenient connecting measures for connecting detachable portions of the resilient body 11. For example, each of the wing portions may be formed as detachable modules joined to the bridge portion 12 at the respective joints 17a, 17b (FIG. 1). As illustrated for one of these modular portions, the detachable wing portion 14a' and the bridge portion 12' are respectively formed with elongate internal bores 34a, 32a. A malleable frame member in the form of a bendable rod 30a may insert partially into the wing portion's bore 34a and insert partially into the bridge portion's bore 32a to join the two portions 14a', 12' together. The resulting structure would then be malleable to form at any point along the length of this bendable rod 30a. Any suitable measures may be taken to fasten the joint, such as fastening members on the adjoining end faces of the two portions 14a', 12'. Depending on the combination of materials selected for the portions 14a', 12' and the rod member 30a, the natural frictional engagement of the rod 30a tightly fitted within the bores 34a, 32a may be sufficient to retain the joint for most applications. Moreover, the striping member 13, if employed, may also reinforce the joint's retention in such applications.

It is not unusual for interactive sessions of different individuals to be linked together. In that way, individuals even at different geographic locations to remotely link their interaction sessions for a shared virtual experience. In a computer gaming application, for instance, the linked individuals may then collaborate with or compete with one another within the same virtual environment. Where the linked computer systems/gaming consoles do not provide for real time communication through the virtual environment (through sound effects and visual graphics generated within the virtual environment), audio and/or video measures may be provided on the device 10 for real time communication between the participating individuals during the linked interactive session. This would establish and maintain a real-time communications link through which the individuals may talk with and view one another during the interactive session. This not only allows for the exchange of information needed for a productive interactive session, it allows for the users to indulge in real-time trash talk or share other friendly, amusing banter to enhance the interactive experience.

Figure 5:
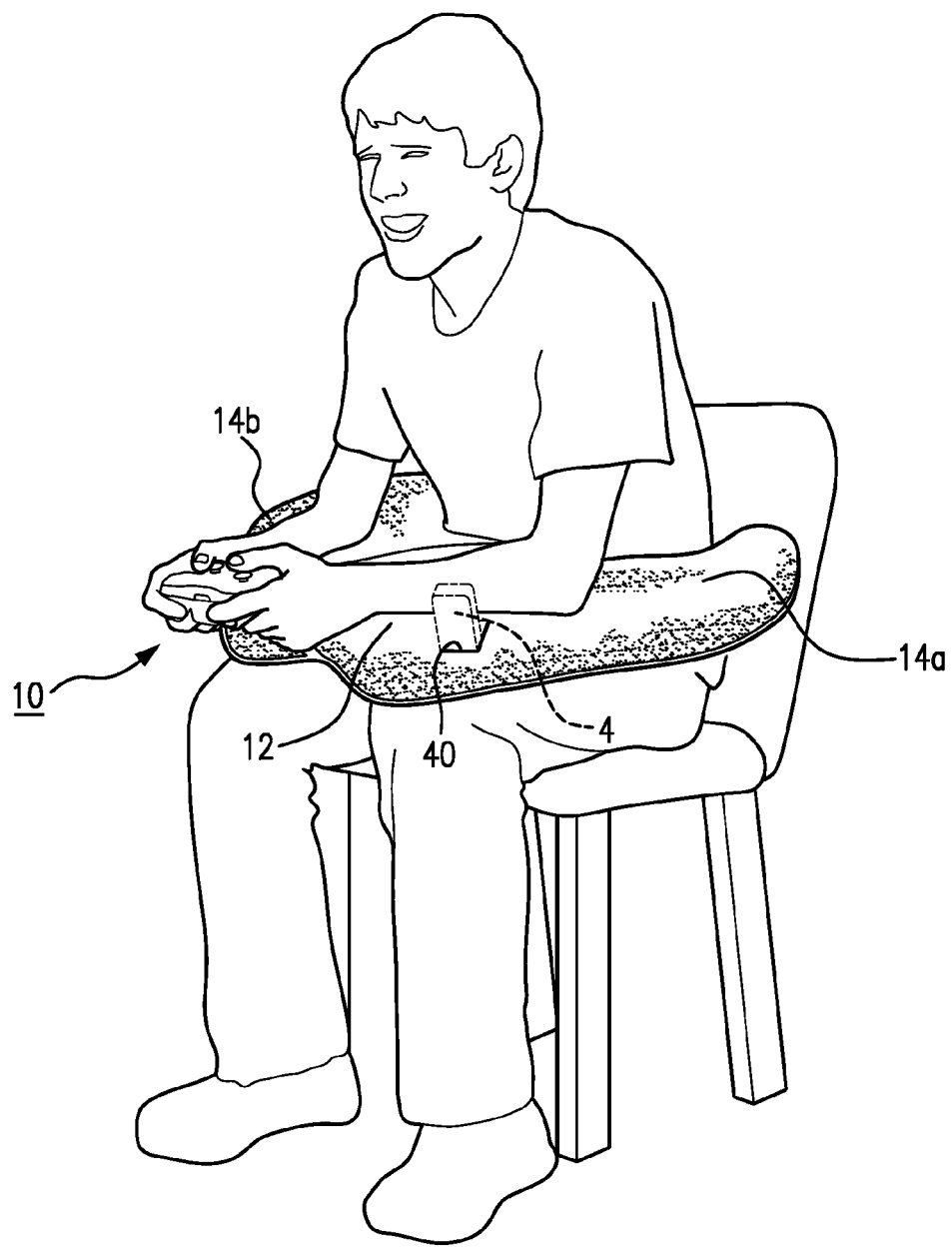
FIG. 5 is a perspective view schematically illustrating the embodiment of FIG. 1 during use in one exemplary application.
Figure 6:
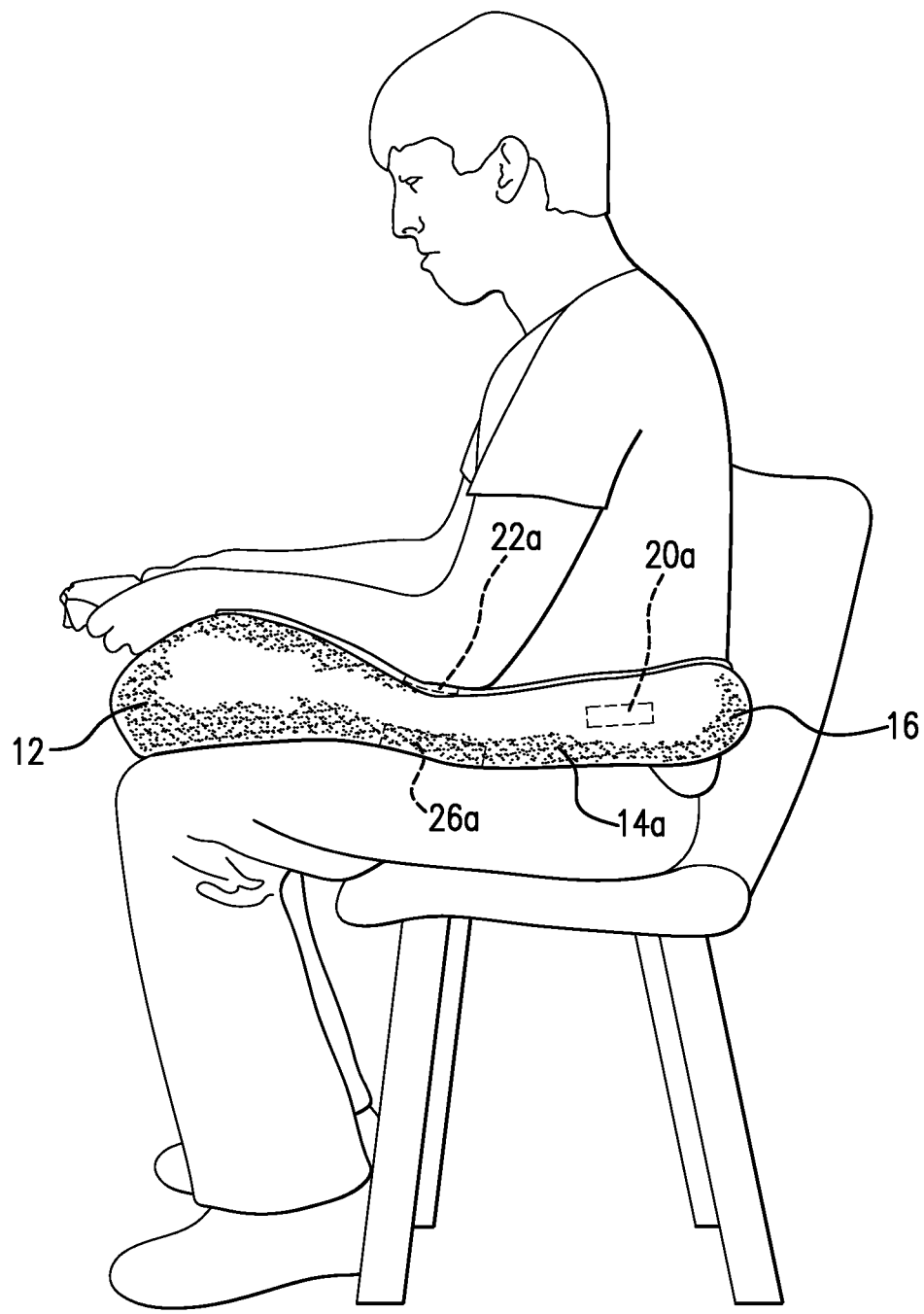
FIG. 6 is a side elevational view schematically illustrating the embodiment of FIG. 1 during use in one exemplary application.
Figure 7:
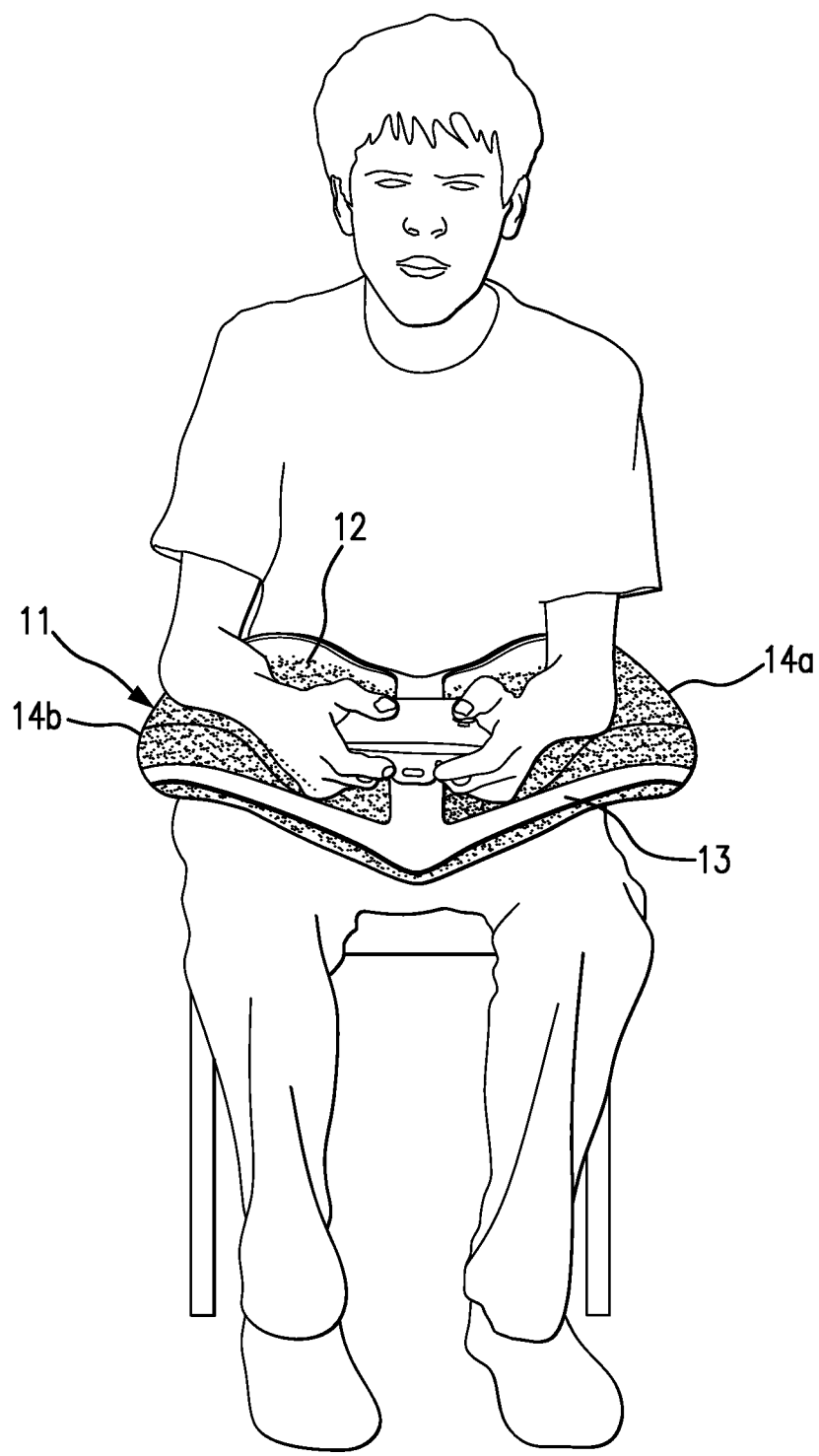
FIG. 7 is a front elevational view schematically illustrating the embodiment of FIG. 1 during use in one exemplary application.
Figure 8:
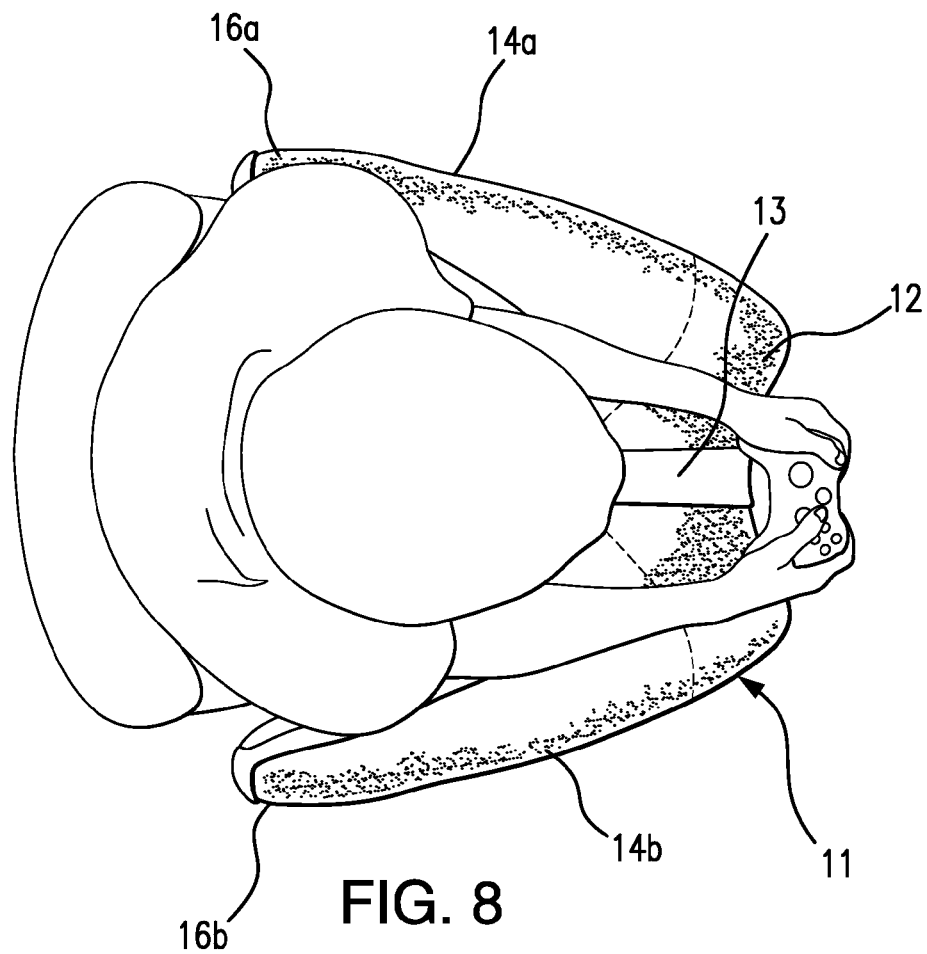
FIG. 8 is a plan view schematically illustrating the embodiment of FIG. 1 during use in one exemplary application.

Such a real-time link may simply be established through personal communication devices separately operated by the linked individuals, such as telephones, smart phones, skype phones, or the like. In accordance with certain exemplary embodiments, the apparatus 10 is equipped with measures to accommodate in this regard. As illustrated in FIG. 5, a docking station 40 may be formed into a portion of the resilient body 11, such as the bridge portion 12. This docking station 40 would conveniently receive a smart phone or other communication device 4 therein. The docking station 40 preferably provides a recessed compartment for stable support of the communication devices 4 as well as USB or other such interface connection suitable for the particular communication device 4 so that it may be recharged during use. The communication device 4 may also be interconnected thereby for communication with a local controller within the apparatus 10, the gaming console, or the handheld control device to realize other supplemental functions in the intended application.

Depending on the capabilities of the communication device 4, the participating individuals may then carry on a teleconference-like interaction in the physical realm while concurrently carrying on their interaction in the virtual realm. In alternate embodiments, apparatus 10 may be equipped with auxiliary microphone/speaker and camera/monitor components in place of or in addition to the docking station 40. Those auxiliary components would be coupled to a local power source and either a local controller, gaming console, and/or controlling device as necessary to establish a conferencing link between the participating individuals.

Various other accessory components may be provided on the apparatus 10 to suit the particular requirements of different intended applications. Light emitting diodes (LED) or other sources of visual indicia may be provided on different portions of the resilient body 11. For example, various LED components may be accordingly situated to provide desired mood lighting. They may be selectively activated to signify different system conditions, or just to vary the aesthetic appearance of the apparatus 10.

Figure 4:
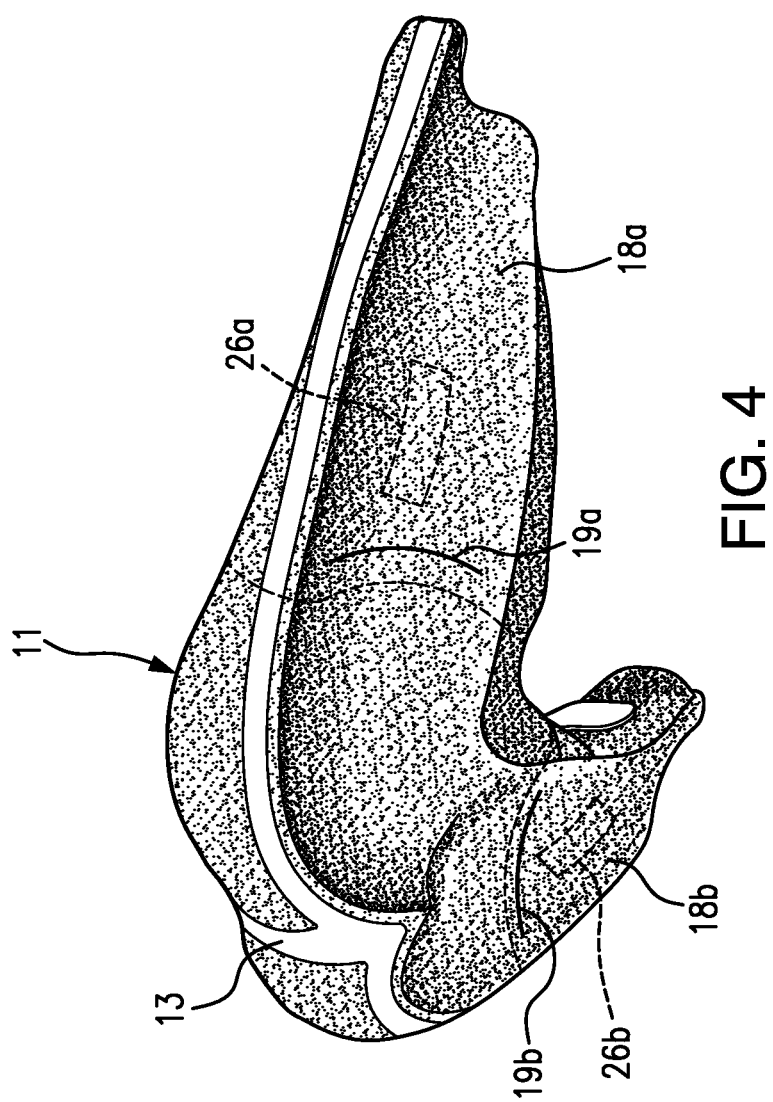
FIG. 4 is a bottom perspective view of the embodiment of FIG. 1.

In certain other embodiments, the resilient body 11 may be enclosed within a jacket, sleeve, or some other form of flexible protective cover. Additionally, one or more storage pockets may be formed on a surface of the resilient body 11. One example is illustrated in FIG. 4 where a pocket 19a, 19b is defined along each of the bottom surfaces 18a, 18b within which to stow a controlling device, connection cables, and/or other such accessories between interactive sessions.

Figure 10:
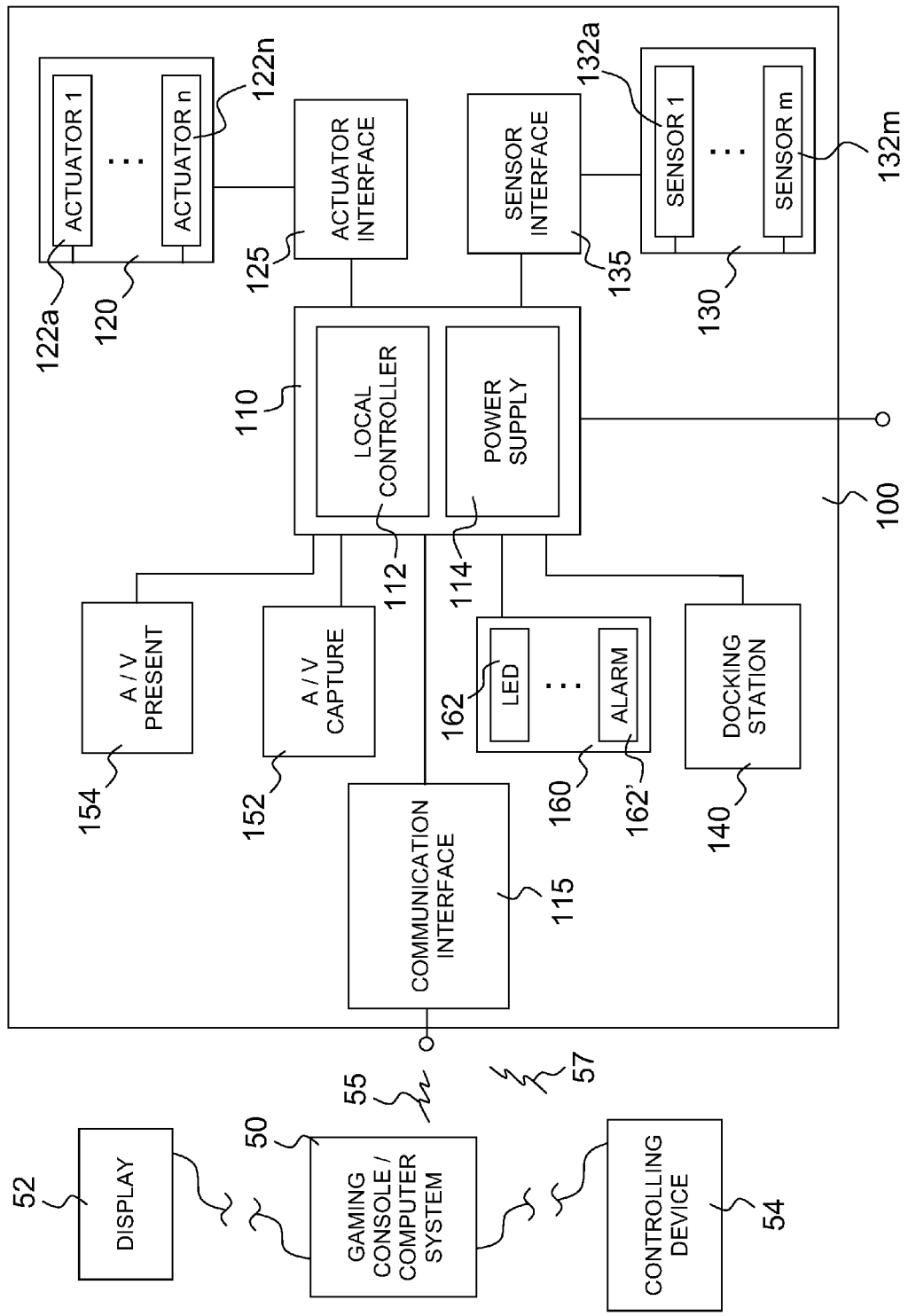

Turning now to FIG. 10, there is shown a block diagram schematically illustrating the intercoupling of units in a functional system 100 operating within apparatus 10 in accordance with one exemplary embodiment of the present invention, to implement various functional features disclosed herein. System 100 in this example is configured for illustrative purposes to suit a computer gaming application, but may be suitably configured for use in various other applications and contexts. Those skilled in the art will readily recognize that the block diagram is highly simplified, with numerous components such as dynamic and static storage devices, switching devices, and the like omitted in the interests of brevity and clarity. The exemplary system 100 preferably includes a hub unit 110 to which the various operational accessories/components are coupled for operational control. The hub unit 110 preferably includes a microprocessor-based local controller 112 programmably configured in a manner suitable for the intended application to communicate with devices outside the apparatus 10 execute the software necessary to maintain control over the various units of system 100. The hub unit 110 also includes a power supply 114 coupled either to a direct current (DC) source such as a portable battery source (which may be provided within the resilient body 11 in certain embodiments), or to an alternating current (AC) source such as a standard electrical wall outlet available at a given site. The power supply 114 is suitably configured to adapt the externally supplied power levels to meet the power requirements of the various units employed in system 100.

Among the operational units coupled to the hub unit 110 is an actuator unit 120 which preferably includes a plurality of individual actuators 122a-122n which may be implemented as the variously positioned actuators 20a, 20b, 22a, 22b, 24a, 24b, 25, 26a, 26b on the resilient body 11 as shown in FIGS. 1-8. The individual actuators 122a-122n are preferably actuated independently by the local controller 112, responsive to the virtual events as they unfold during the given interactive session.

Like the other units of system 100, actuator unit 120 is shown coupled to the hub unit 110 via a single connection line. The interconnection is represented this way for gravity and clarity, and one skilled in the art will recognize that such interconnection may actually include a plurality of individual interconnection paths between the individual actuators 122a-122n and each of the local controller and power supply portions 112, 114 of the hub unit 110. Preferably, such interconnection between the actuator unit 120 and the hub unit 110 is made through an actuator interface unit 125 which provides the digital-to-analog and analog-to-digital conversions and other such signal conditioning that may be required for proper signal interface between the units and the particularly intended application.

As described in preceding paragraphs, the actuators 122a, 122n are preferably implemented in the form of feedback devices of any suitable type known in the art. In this regard, the local controller 112 of the hub unit 110 communicates with either the host computer system for the given interaction session (such as the gaming console in the given application) or the user's handheld or other controlling device 54, via communication links 55, 57 and a super communication interface 115. The communication interface 115 provides the necessary modulation/demodulation, buffering, protocol conversion, or any other suitable adaptation measures to preserve compatibility between the hub unit 110 and the external system 50 and device 54. Communications between the local controller 112 and the external system 50 and/or the external controlling device 54 preferably employs a suitable application programming interface (API) which establishes a particular set of rules and specifications followed by software programs executing in the system 50, device 54, and local controller 112. This shared interface enables haptic interface signals to be exchanged between those software programs, such that the local controller 112 may generate or pass on appropriate commands to cause electromechanical, electroacoustic, thermoelectric, or electropneumatic response by the various actuators 122a-122n in substantially real time response to the virtual action generated by the computer system 50. As mentioned, such haptic response may be based on interface signals obtained by the local controller 112 from either the computer system 50 or the controlling device 54. In certain alternate embodiments, one or more of the actuators 122a-122n may receive the interface signals directly (that is without intervention of a local controller 112) to be controlled directly by either the computer system 50 or the controlling device 54 for appropriate haptic response.

While the communication links 55 and 57 are represented as wireless links, either or both of these communication links 55, 57 may be implemented as physically wired links. Likewise, while the links between the computer system 50 and each of the display 52 and controlling device 54 are shown as hardwired links, either of these links may be actually be implemented as a wireless link as well.

Referring back to the units within system 100, various other auxiliary units may be operably coupled to the hub unit 110 in various embodiments. For example, a sensor unit 130 may be coupled via a sensor interface 135. As described in preceding paragraphs, the sensor unit 130 may include a plurality of sensors 132a-132m variously positioned on the resilient body 11 which serve as detection/pickup devices to provide controlling input ultimately for use by the computer system 50 and/or the controlling device 54. One or more of the sensors 132a-132m may be implemented by corresponding actuators 122a-122n actuated in a reverse mode of operation to generate such control input signal in response to detection of mechanical force, thermal deviation, or the like in the user. Like the actuator interface 125, sensor interface 135 is preferably employed in such embodiments to provide what signal conditioning may be necessary for signal compatibility with hub unit 110.

A docking station unit 140, when employed, is also preferably coupled to the hub unit 110. The docking station unit 140 would suitably connect a communication device docked therein at least to the power supply 114 so that the internal power source of that communication device would not be depleted during use, but in fact restored and charged if necessary. The docking station unit 140 may also interconnect the communication device to the local controller 112 for interactive communication with the computer system 50, depending on the particular requirements of the intended application.

Other auxiliary units which may be similarly coupled to the hub unit 110 include audio/video capture unit 152 and audio/video presentation unit 154. These units 152, 154, where employed, would provide the necessary microphone, camera, speaker, and display devices to preferably provide a real time video conferencing (or at least teleconferencing) capability with a remote co-participant in the interactive session, where a suitable communication device or a docking station unit 140 for its docking is unavailable. Other auxiliary units that may be coupled to the hub unit 110 include an indicia unit 160 which may be equipped with an LED 162, or various alarm/alert devices 162' to provide status indications or other such conspicuous alerts for a user who may be too engrossed in the interaction session to otherwise take note of certain noteworthy, possibly even critical, system conditions.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. An apparatus for combined ergonomic support and situational sensory augmentation interface during an interactive session within a virtual environment generated by a computer system, comprising:
   a portable resilient body defining a mid portion extending laterally between a pair of side portions projecting transversely outward therefrom to terminate at respective free ends, said mid portion extending across a lap of a user, said mid and side portions collectively defining an upper surface for hand and forearm support for the user and an inner side surface contoured about a cradle space for receiving a torso of the user in cradling manner; and,
   a plurality of actuators integrated in said resilient body to respectively bear against a plurality of preselected anatomical parts of the user during the interactive session, each of said plurality of actuators being selectively driven in cooperation with the interactive session to generate tactile feedback to a corresponding one of the preselected anatomical parts of the user.

2. The apparatus as recited in claim 1, further comprising a controller coupled to said actuator, said controller communicating with the computer system to drive said actuator responsive thereto, the tactile feedback being thereby generated in time synchronized manner with progression of the interactive session within the virtual environment.

3. The apparatus as recited in claim 2, further comprising a docking station for an external communication device recessed within said resilient body, said docking station being coupled to said controller to maintain an audio and video link with a remote site through the external communication device docked therein during the interactive session.

4. The apparatus as recited in claim 2, further comprising at least one communication device disposed on said resilient body and coupled to said controller to establish an audio and video link with a remote site therethrough to maintain a real-time trash talk link during the interactive session.

5. The apparatus as recited in claim 1, wherein each of said side portions includes a bottom surface defining a concave contour for conformed engagement of the user's lap.

6. The apparatus as recited in claim 5, wherein said actuator is disposed to deliver the tactile feedback to the user through at least one of said upper, inner side, and bottom surfaces of said resilient body.

7. The apparatus as recited in claim 1, wherein at least one of said mid and side portions is reconfigurable in shape.

8. The apparatus as recited in claim 7, wherein at least one of said mid and side portions includes a malleable frame member embedded therein for providing structural support.

9. The apparatus as recited in claim 8, wherein each of said side portions is detachably coupled to said mid portion by at least one said malleable frame member extending internally therebetween.

10. The apparatus as recited in claim 2, wherein said plurality of actuators are disposed on said resilient portion displaced one from the other, said actuators being selectively driven by said controller for delivering haptic feedback to at least one corresponding area of the user's torso, forearms, or thighs.

11. The apparatus as recited in claim 10, wherein said actuators are each embedded within said resilient body, each said actuator including a transducer of a type selected from the group consisting of: electromechanical, electroacoustic, thermoelectric, and electropneumatic.

12. The apparatus as recited in claim 2, further comprising at least one tactile sensor disposed on said resilient body and coupled to said controller, said tactile sensor generating a sensory signal for supplemental controlling input to the virtual environment responsive to tactile actuation thereof by the user.

13. The apparatus as recited in claim 12, wherein at least one said actuator is reconfigurable in mode of operation to said tactile sensor.

14. The apparatus as recited in claim 1, wherein said resilient body includes at least one pocket defining a storage compartment for accessory equipment.

15. An ergonomic support apparatus for delivering haptic feedback to a user in accordance with computer interactive user activity within a virtual environment generated by a computer system, comprising:
  a portable resilient body defining a bridge portion extending laterally between a pair of malleably reconfigurable wing portions projecting transversely outward therefrom to terminate at respective free ends, said bridge portion extending across a lap of a user, said bridge and wing portions collectively defining an upper surface for hand and forearm support for the user and an inner side surface contoured about a cradle space for receiving a torso of the user in cradling manner;
  a plurality of actuators integrated in said resilient body to respectively bear against a plurality of parts of the user's torso during the interactive session, each of said plurality of actuators being selectively driven in coordination with the computer interactive user activity to generate tactile feedback to a corresponding part of the user's torso through at least one of said upper and inner side surfaces of the resilient body; and,
  a controller disposed on said resilient body and coupled to said actuator, said controller communicating with the computer system to drive said actuator responsive thereto, the tactile feedback being thereby generated in time synchronized manner with progression of the computer interactive user activity within the virtual environment to augment sensory feedback to the user.

16. The ergonomic support apparatus as recited in claim 15, further comprising at least one communication device disposed on said resilient body and coupled to said controller to establish an audio and video link with a remote site therethrough to maintain a real-time trash talk link during the interactive session.

17. The ergonomic support apparatus as recited in claim 15, wherein each of said wing portions includes a bottom surface defining a concave contour for conformed engagement of the user's lap; and, said upper surface of said resilient body defines an undulating contour.

18. The ergonomic support apparatus as recited in claim 15, wherein each of said wing portions is detachably joined to said bridge portion by a skeletal frame member extending malleably therebetween for providing structural support.

19. The ergonomic support apparatus as recited in claim 15, wherein said plurality of actuators are disposed on said resilient portion displaced one from the other, said actuators being selectively driven by said controller for delivering haptic feedback to the user at corresponding parts of the user's torso, forearms, and hands.

20. The ergonomic support apparatus as recited in claim 19, wherein said actuators are each embedded within said resilient body, each said actuator being selectively energized to apply tactile feedback of a type selected from the group consisting of: force, pressure, vibration, and temperature.

21. The ergonomic support apparatus as recited in claim 15, further comprising at least one tactile sensor disposed on said resilient body and coupled to said controller, said tactile sensor generating a sensory signal for supplemental controlling input to the virtual environment responsive to tactile actuation thereof by the user.

22. An ergonomic support apparatus for delivering haptic feedback to a user in accordance with computer interactive user activity within a virtual environment generated by a computer system, comprising:
  a portable resilient body malleably reconfigurable to selectively conform to the user's anatomy, said resilient body defining a bridge portion extending laterally between a pair of wing portions projecting transversely outward therefrom to terminate at respective free ends, said bridge portion extending across a lap of a user, said bridge and wing portions collectively defining an upper surface for hand and forearm support for the user and an inner side surface contoured about a cradle space for receiving a torso of the user in cradling manner;
  a plurality of actuators integrated in said resilient body displaced one from the other to respectively bear against a plurality of preselected parts of the user's anatomy during the interactive session, each of said plurality of actuators being selectively driven in coordination with the computer interactive user activity to generate tactile feedback at a corresponding one of the parts of the user's torso, forearms, and hands through at least one of said upper and inner side surfaces of the resilient body;
  a controller disposed on said resilient body and coupled to said actuators, said controller communicating with the computer system to drive said actuators responsive thereto in time synchronized manner with progression of the computer interactive user activity within the virtual environment, sensory feedback to the user being thereby augmented; and,
  at least one communication device disposed on said resilient body and coupled to said controller to establish an audio and video link with a remote site therethrough to maintain a real-time trash talk link during the interactive session.

23. The ergonomic support apparatus as recited in claim 22, further comprising at least one tactile sensor disposed on said resilient body and coupled to said controller, said tactile sensor generating a sensory signal for supplemental controlling input to the virtual environment responsive to tactile actuation thereof by the user.

24. The ergonomic support apparatus as recited in claim 23, wherein:
  said resilient body includes at least one skeletal frame member malleably embedded therein;
  each of said wing portions includes a bottom surface defining a concave contour for conformed engagement of the user's lap; and,
  said upper surface of said resilient body defines an undulating contour.

* * * * *